Figures 1, 2:
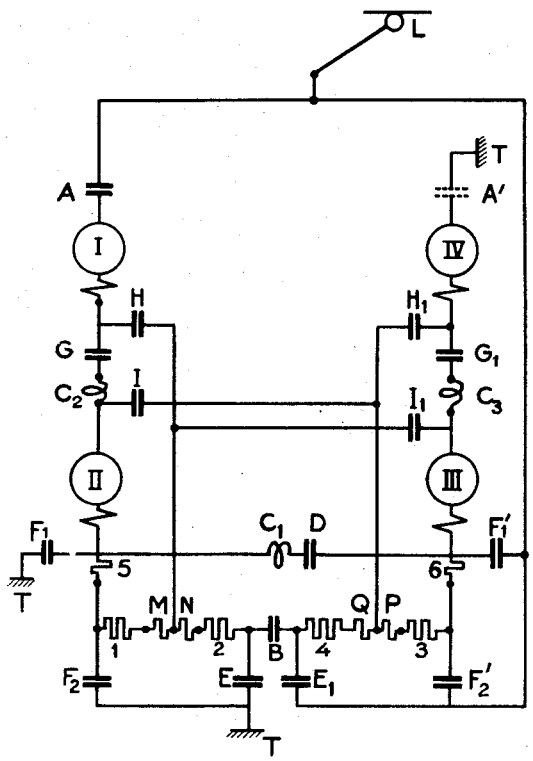

Oct. 10, 1950 — L. HEIDMANN — 2,525,296
ELECTRIC TRACTION EQUIPMENT
Filed June 25, 1947 — 2 Sheets-Sheet 1

| Positions | Coupling contactors | | | | | | | | | | | | | | |
|---|---|---|---|---|---|---|---|---|---|---|---|---|---|---|---|
| | A | B | D | E | $E_1$ | $F_1$ | $F_2$ | $F_1'$ | $F_2'$ | G | $G_1$ | H | $H_1$ | I | $I_1$ |
| 0 | | | | | | | | | | | | | | | |
| Series 1 | o | o | | | | | | | | o | o | | | | |
| " 2 | o | o | o | | | | | | | o | o | | | | |
| First transition 3 | o | | o | | | | | | | o | o | | | | |
| " " 4 | o | | o | o | o | | | | | o | o | | | | |
| Series parallel 5 | o | | | o | o | | | | | o | o | | | | |
| " " 6 | o | | | o | o | o | o | o | o | o | o | | | | |
| Second transition 7 | o | | | o | o | o | o | o | o | | | o | o | o | o |
| Parallel 8 | o | | | o | o | o | o | o | o | | | o | o | o | o |

INVENTOR
Leon Heidmann
By Shoemaker & Mattare
ATTORNEYS

Oct. 10, 1950 L. HEIDMANN 2,525,296
ELECTRIC TRACTION EQUIPMENT
Filed June 25, 1947 2 Sheets-Sheet 2

INVENTOR
Leon Heidmann
By Shoemaker & Mattare
ATTORNEYS

Patented Oct. 10, 1950

2,525,296

UNITED STATES PATENT OFFICE 2,525,296

ELECTRIC TRACTION EQUIPMENT

Leon Heidmann, Jeumont, France, assignor to Forges et Ateliers de Constructions Electriques de Jeumont, Paris, France, a French body corporate Application June 25, 1947, Serial No. 756,840
In France June 26, 1946

5 Claims. (Cl. 318—96)

This invention relates to electric traction equipment intended to effect more than two couplings of the motors, for example one coupling in series, one or two in series-parallel and one in parallel.

In my co-pending application Serial No. 762,429, filed July 21, 1947, now Patent No. 2,511,259, I have disclosed an equipment for starting six motors, all transitions of which are effected by the "bridge" method.

An object of the present invention is to provide an improved electric traction equipment of this character comprising four motors or four groups of motors, capable of effecting not only the series-parallel transition, but also all other transitions according to the "bridge" method which presents well known advantages in comparison with the so-called "shunt" method whereby some of the motors are eliminated during the transition stages.

Another object of the invention is to provide improved electric traction equipment of the character set forth, in which the motors, contactors, resistances and the like are so connected that all the circuits connected in parallel are substantially symmetrical, affording great regularity in current distribution.

A further object of the invention is to improve this current distribution by the use of additional balancing resistances without increasing substantially the energy losses.

Other objects and advantages of the invention will become apparent from the description of an embodiment illustrated in the accompanying drawing and relating to the particular case of a four-motor traction equipment providing three couplings, viz. series, series-parallel and parallel.

Figure 3:
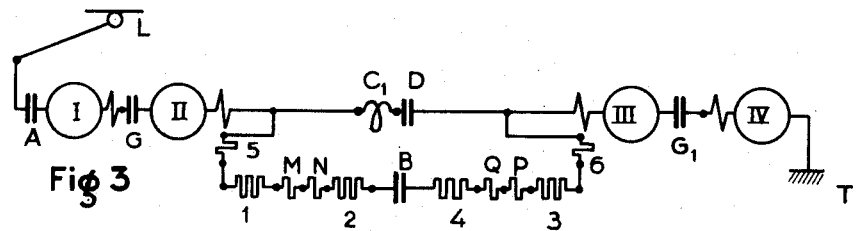
Figure 4:
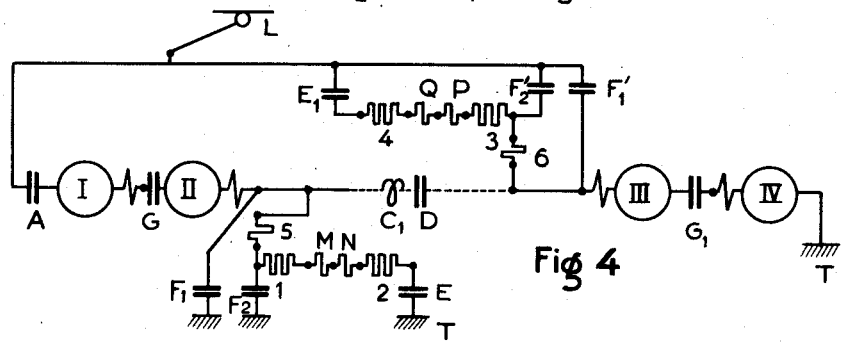
Figure 5:
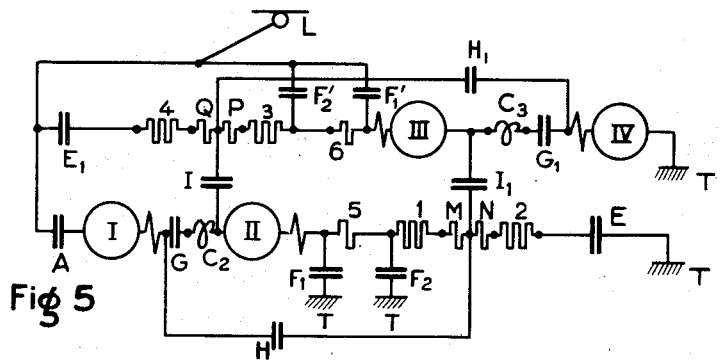
Figure 6:
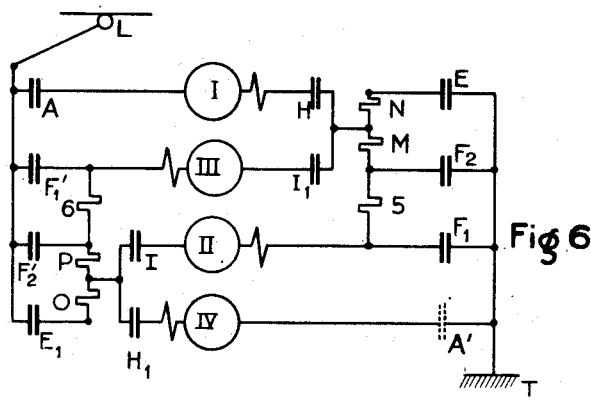

In this drawing, Fig. 1 is a simplified diagram of the equipment giving a general view of the complete apparatus and showing all the fixed wiring through the motors, switches and resistors; Fig. 2 is a diagram of the order of closing the various coupling switches or contactors, and Figs. 3 to 6 are diagrams showing the wiring of all important parts as they are connected in each of the various motor couplings. Fig. 3 shows the series connections, Fig. 4 shows the transition to series-parallel coupling, Fig. 5 shows the transition to parallel coupling and Fig. 6 is the diagram for the parallel coupling.

In Fig. 1 is shown a circuit layout with two motor branches each including two of the four motors I to IV which are connected between the line L and the ground points T. The equipment illustrated comprises the following coupling contactors, viz. one line contactor A, one resistance midpoint contactor B, one series bridge contactor D, two series-parallel connection contactors E and $E_1$, four resistance eliminating contactors $F_1$ $F_2$ $F_1'$ and $F_2'$, two series-parallel bridge contactors G and $G_1$, and four parallel connection contactors H, $H_1$, I and $I_1$; it should be noted that those of the coupling contactors which are designated by the same letter operate simultaneously.

Apart from the starting resistances 1, 2, 3 and 4, the equipment comprises additional balancing resistances 5, 6, M, N, P, Q, the function of which will be explained hereinafter.

The starting contactors, which are intended to control the rheostats 1 to 4, have not been shown in order to simplify the figures.

This diagram of connections is distinguished, as can be seen, by its symmetrical arrangement, which would have been complete (except for the polarity of the terminals) if it had included a contactor A', as shown in broken lines; however, as one pole of the motor IV is permanently connected to ground, this contactor has been eliminated as being obviously unnecessary.

The order of operation of the coupling contactors is shown in Fig. 2, in which the position O corresponds to the conditions of rest, the positions 1 and 2 correspond to the series operation of the motors, the positions 3 and 4 to the series-parallel transition, the positions 5 and 6 to the series-parallel operation, the position 7 to the parallel transition and the position 8 to the parallel operation.

From this figure, it can be seen for example that the four contactors of the group F (i. e. $F_1$, $F_2$, $F_1'$ and $F_2'$) are only closed in the positions 6, 7 and 8.

It should be noted that Fig. 2 only shows the main positions which are necessary to understand the operation, so that it does not include any starting or regulating positions, etc.

In the position 1, the coupling contactors A, B, G and $G_1$ are closed, as shown in Fig. 2. This produces the symmetrical series connection of the four motors according to Fig. 3, in which all resistances are in circuit. It will be seen that the additional balancing resistances 5, M, N, Q, P and 6 are in circuit too, so that they are also used for starting purposes.

Conventional rheostatic contactors, not shown in the drawings, are used to eliminate in a known manner the resistances 1, 2, 3 and 4. This produces a desired number of starting steps, Finally the position 2 is reached by the closure of the coupling contactor D which results in the elimination of all resistances and prepares the first transition.

This transition is effected in the positions 3 and 4 (Fig. 2) by the bridge method as shown in Fig. 4. The bridge contactor D being closed, the contactor B is opened in the position 3 and the contactors E and E₁ are closed instead (position 4), thus completing two symmetrical circuits between the line L and the ground T, the first comprising the motors I and II and the resistances 5, 1, M, N, 2, and the second the resistances 4, Q, P, 3, 6 and the motors III and IV.

The bridge connection is then interrupted by opening the contactor D in the position 5. This is the series-parallel position, in which the resistances 1, 2, 3 and 4 are eliminated step by step in the conventional way by rheostatic contactors (not shown), the balancing resistances Q, P, 6 and 5, M, N, maintaining the equilibrium between the two parallel circuits.

In the position 6, which corresponds to the last step of the series-parallel operation, the contactors F₁, F₂, F₁' and F₂' are closed, eliminating completely all resistances.

Fig. 5 shows exactly the same connections as in Fig. 4, but with the addition of the coupling contactors H, H₁, I and I₁. It will be seen that this diagram presents also symmetry features.

In the position 7 (Fig. 2) those contactors H, H₁, I, I₁ are closed which produces the following connections: the motor I receives current in series with the contactor A, the resistances N and 2 and the contactor E, the motor II receives current through the intermediary of the contactor F₂', the resistances 3 and P and the contactors I and F₁; the motor III is in series with the contactor F₁', the contactor I₁, the resistors M and 1 and the contactor F₂ and the circuit of the motor IV comprises the contactor E₁, the resistances 4 and Q and the contactor H₁.

The two bridge connections are opened by the contactors G and G₁ which produces the four-circuit parallel coupling of the position 8 in which the resistances 1, 2, 3, 4 are eliminated step by step.

When this resistance elimination is achieved, the final parallel connections correspond to Fig. 6.

It should be noted that the parallel coupling diagram thus obtained according to Fig. 6 is likewise symmetrical, which favors the equal distribution of the currents during and after the transition. On the other hand, the equilibrium of the currents which flow through the contactors and circuits connected in parallel, is greatly improved by the additional resistances 5 and 6 and by the four resistances M, N, P, Q. These latter resistances may be of extremely low value, for example of the same order of magnitude as the resistance of a closed contactor, so that their losses may be negligible. In spite of this, they provide a satisfactory balance whereby each contactor has only to carry the current of one motor. As regards the resistances 5 and 6, practically no current passes through them in the parallel coupling position.

It will thus be seen that in the embodiment as described, the additional resistances 5 and 6 perform a dual function: on the one hand, the cutting out of said resistances provides an additional rheostat notch at the end of the "series" operation and at the end of the "series-parallel" operation; on the other hand, at the end of the "parallel" operation, their presence effects, in co-operation with the low resistances M, N, P, Q, the equal distribution of the current amongst the parallel contactors and circuits shown in Fig. 6.

Another advantage of the invention is that the correct bridge-method transition is obtained not only when passing from series to series-parallel operation, but also when passing to the parallel coupling.

These results are due in particular, to the above-mentioned main features of the invention which may be summarized as follows:

The connections which are successively made in the course of the various couplings and transition positions, as illustrated in Figs. 1, 3, 4, 5 and 6, are arranged so that the corresponding diagrams present a certain symmetry which is obtained by a suitable distribution of the motors I to IV, contactors, resistances and their connections. Such symmetry is sufficient for the various circuits connected in parallel to be always substantially identical with one another, thereby contributing to the regularity and continuity of the transitions and of the operation of the motors.

The equipment comprises additional balancing resistances 5, 6, M, N, P and Q, so arranged as to ensure correct distribution of the currents among the contactors or like members connected in parallel, some of said resistances 5, 6, being so arranged as to be eliminated at the end of the starting period, while others M, N, P and Q, which remain in circuit, are of very low ohmic value.

The balancing resistances 5, 6 adapted to be finally eliminated are arranged so as to provide in certain couplings an additional rheostat notch, while in other couplings their presence ensures, in co-operation with the additional resistances M, N, P and Q, which have not been eliminated, the equal distribution of the currents between the various circuits and contactors in parallel.

The various diagrams are so designed that the currents flowing through the coupling contactors are never very much heavier than those corresponding to the current of one motor (or a group of motors which remain inseparable).

What I claim is:

1. In an electric traction equipment of the four motor type with series, series-parallel and parallel couplings of the motors, an arrangement for effecting both coupling transitions by the bridge method, comprising a circuit layout with two motor branches, two motors in each of said branches, four identical starting resistances connected to form two groups of the two series-connected resistances in the respective motor branches, the midpoint of each resistance group being connected to points between the two motors of each of said branches, four contactors controlling the connections of said resistance group midpoints to said branches, a contactor connected between said resistance groups, a series bridge contactor connected between the opposite ends of said resistance groups, and two series-parallel bridge contactors each inserted between the two motors of one of said branches at a position between the connections of said resistance group midpoints, and a plurality of all said contactors being connected and located to form identically arranged motor circuits in the series-parallel and parallel couplings.

2. In an electric traction equipment of the four motor type with series, series-parallel and parallel couplings of the motors, an arrangement for effecting both coupling transitions by the bridge method, comprising a circuit layout with two motor branches, two motors in each of said branches, four identical starting resistances connected to form two groups of two series-connected resistances in the respective motor branches, the midpoint of each resistance group being connected to points between the two motors of each of said branches, four contactors controlling the connections of said resistance group midpoints to said branches, a contactor connected between said resistance groups, a series bridge contactor connected between the opposite ends of said resistance groups, two series-parallel bridge contactors each inserted between the two motors of one of said branches, a line contactor connected to energize one of said branches, two series-parallel coupling contactors adapted to connect one terminal of said series bridge contactor to ground and the other to the line, and four parallel coupling contactors adapted to close in the parallel motor connection only, two of said parallel coupling contactors being connected each between one motor and the midpoint of the respective resistance group, and the two others of said parallel coupling contactors being similarly connected each between one of the remaining motors and the midpoint of the other resistance group, all said contactors being distributed and connected to form identically arranged motor circuits in the series-parallel and in the parallel couplings.

3. In an electric traction equipment arranged according to claim 2, means for providing additional starting steps and for improving the balanced current distribution, comprising two additional resistances interposed each between one of said resistance groups and one of said motor branches, said additional resistances being connected to be short-circuited at the last series position by said series contactor and at the last series-parallel position by said resistance-eliminating contactors.

4. In an electric traction equipment arranged according to claim 2, means for equilibrating the current distribution between contactors which are connected in parallel, comprising four relatively low-value additional balancing resistances two of which are inserted symmetrically in the middle of each of said starting resistance groups, the parallel coupling contactors being connected respectively to the midpoints situated between said additional balancing resistances.

5. In an electric traction equipment arranged according to claim 2, means for equilibrating the current distribution between contactors which are connected in parallel, comprising four relatively low-value additional balancing resistances two of which are inserted symmetrically in the middle of each of said starting resistance groups, the parallel coupling contactors being connected respectively to the midpoints situated between said additional balancing resistances in such a way that in full parallel coupling the said additional balancing resistances remain operative.

LEON HEIDMANN.

REFERENCES CITED

The following references are of record in the file of this patent:

UNITED STATES PATENTS

| Number | Name | Date |
|---|---|---|
| 1,061,299 | Jones | May 13, 1913 |
| 1,231,663 | Storer | July 13, 1917 |
| 1,263,373 | Case | Apr. 23, 1918 |
| 1,264,941 | Jones et al. | May 7, 1918 |
| 1,323,248 | Clarke | Dec. 2, 1919 |
| 1,371,603 | Clarke et al. | Mar. 15, 1921 |
| 1,907,126 | Scofield | May 2, 1933 |

FOREIGN PATENTS

| Number | Country | Date |
|---|---|---|
| 560,198 | Great Britain | Mar. 24, 1944 |